(12) United States Patent
Leonhardt

(10) Patent No.: US 6,328,350 B1
(45) Date of Patent: *Dec. 11, 2001

(54) QUARTER TURN COUPLING AND ADAPTER FOR HOSE OF ½ INCH TO ⅞ INCH DIAMETER

(75) Inventor: Duane Leonhardt, Dollard des Ormeaux (CA)

(73) Assignee: Mercedes Textiles Limited, Quebec (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 480 days.

(21) Appl. No.: 08/779,706

(22) Filed: Jan. 7, 1997

(51) Int. Cl.⁷ .................. F16L 17/00; F16L 19/00; F16L 33/18
(52) U.S. Cl. .................. 285/360; 285/376; 285/401; 285/70; 285/73
(58) Field of Search ................ 285/360, 376, 285/401, 70, 73

(56) References Cited

U.S. PATENT DOCUMENTS

| | | | |
|---|---|---|---|
| 1,832,990 | * 11/1931 | Lange | 285/360 X |
| 1,911,659 | * 5/1933 | Weaver | 285/360 X |
| 3,645,562 | * 2/1972 | Fandetti et al. | 285/73 |
| 4,666,193 | * 5/1987 | Hockett | 285/360 X |

* cited by examiner

*Primary Examiner*—Lynne H. Browne
(74) *Attorney, Agent, or Firm*—Birch, Stewart, Kolasch & Birch, LLP

(57) ABSTRACT

A hose coupling for ½ inch to ⅞ inch hose comprised of a coupling member having fastening means and a cylindrical opening therethrough, the fastening means comprising a cam and ramp, lug and face, the face supporting a gasket, the cam having a ramp angle between 3 and 5 degrees, the gasket having a thickness of between 220 and 280 microns, the gasket having a face area between 0.4 to 0.6 square inches.

2 Claims, 1 Drawing Sheet

QUARTER TURN COUPLING AND ADAPTER FOR HOSE OF ½ INCH TO ⅞ INCH DIAMETER

This invention is in the field of hose couplings. More particularly the invention is in the field of couplings having cams and lugs in which the cams and lugs of adjoining hose may be engaged for quick coupling. The invention lies in the manufacture of couplings having cams and lugs for use on smaller hose such as ½ inch to ⅞ inch diameter hose. The coupling or adapter of this invention situated at the ends of smaller hose enables a person to join facing ends of two hoses with a quarter turn of movement.

The lugs of the couplings are adapted to engage the cam of the opposite coupling When opposing couplings are rotated relative to one another the surface of the lug engages the surface of the cam of the opposed coupling. The surface of the cams of the opposed couplings have inclined or ramp angles. When the lugs of opposed couplings ride on the ramps of the opposed couplings the opposed couplings move axially towards one another and the sealing gaskets of adjoining couplings come into engagement with one another and are pressed together. The couplings of this invention may be connected directly to the hose as known in the art or the couplings may be in the form of adaptors having threaded interiors which may be threaded on the ends of hose having threaded ends.

The problem in using a cam and lug type coupling on small diameter hose is that the coupling when closed by a quarter turn may open through movement of the hose before pressure is applied by liquid in the hose. In order to improve the locking of the couplings on the ends of adjoining small diameter hose the angle of incline of the cam is increased from the 3° ramp angle found in many couplings used for 1½ inch hose to a 4° ramp angle. The increase of the ramp angle of the cam or ramp results in increased axial travel of the opposed couplings relative to one another. The increased axial travel enables thicker gaskets to be used on the mating faces of the opposed couplings. When the opposed couplings are closed by a quarter turn of the lugs relative to one another the thicker gaskets are compressed against one another exerting an equal and opposite force against the face of the coupling tending to maintain the lugs in contact with the cams thus preventing the couplings from moving relative to one another until a positive opening force is applied by an operator.

In addition to the use of thicker gaskets to inhibit uncoupling while there is no pressure or low pressures, the surface area of the face of the gasket has been increased by substantially 35 percent to increase the surface contact area between gaskets of opposing couplings to increase the torque required to uncouple one coupling from another, thus preventing accidental opening of couplings when a hose is being adjusted or moved or when adjoining lengths of hose are being attached end to end prior to fluid under pressure being forced through the hose.

In one embodiment the invention relates to a hose coupling for ½ to ⅞ inch hose comprised of a coupling member having fastening means and a cylindrical opening therethrough, the fastening means comprising a cam and ramp, lug and face, the face supporting a gasket, the cam having a ramp angle between 3 and 5 degrees, the gasket having a thickness of between 220 and 280 microns, the gasket having a face area between 0.4 to 0.6 square inches.

In a second embodiment the invention relates to a ⅞ inch hose coupling in which the cam has a ramp angle of 4 degrees, a gasket thickness of 250 microns and a face area of 0.5 square inches.

Figure 1:
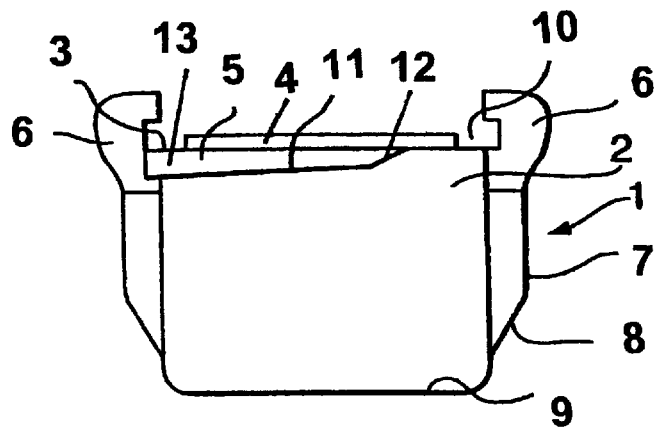
FIG. 1 is a side elevation view of an end member of the cam and lug coupling.

Referring to FIG. 1, a coupling member 1 which is attached to both ends of a length of hose is shown. The coupling members 1 on either end of a piece of hose are identical. As seen in FIG. 1, the coupling member 1 has a generally cylindrical body 2 with a face 3. The face 3 supports a gasket 4 which is adapted to seat against a gasket 4 in the face 3 of an opposite coupling member 1 not shown. Two cams 5 extend circumferentially outwardly commencing at the face 3 and extending radially rearwardly from the face 3. The two cams 5 extend about three quarters of the distance between two lugs 6 disposed on either side of the coupling member 1 at 180° relative to one another. The lugs 6 extend above the face 3 and gasket 4 of the end member 1 and as well extend rearwardly perpendicularly from the face 3 in the form of a depending ridge 7. The depending ridge 7 is high enough to be engaged and retained by a standard wrench when using a wrench to disengage one coupling member 1 of a coupling pair from an identical coupling member 1 of an adjoining hose. The end of the depending ridge 7 features an inclined surface 8 which inclines downwardly to join the surface of cylindrical body 2 proximate the base 9 of the end member. The inclined surface 8 is to prevent snagging the end of the depending ridge 7 of coupling member 1 on wood, rocks or other obstacles. The top of the lug 6 includes slots 10.

Figure 2:
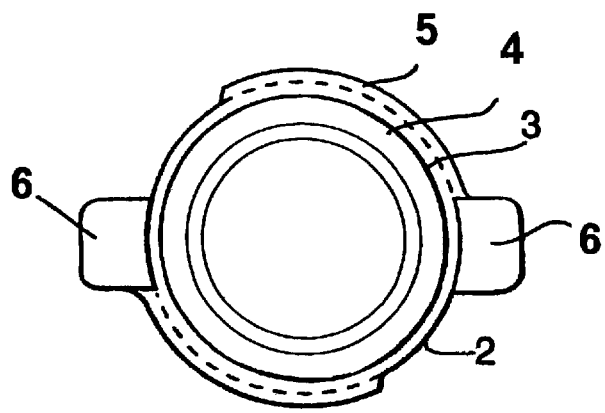
FIG. 2 is a top view of an end member of the cam and lug coupling.
Figure 3:
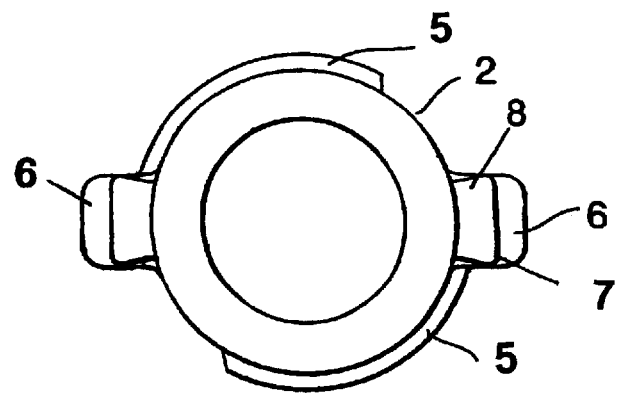
FIG. 3 is a bottom view of an end member of the cam and lug coupling.

Referring to FIG. 1 the ramp 11 of cam 5 is inclined upwardly from the base 12 of the cam to the top 13 of cam 5. The sides and face of gasket 4 extend above the face 3 of coupling member 1. As seen in FIG. 2 the gasket 4 extends over a substantial portion of the face 3 of coupling member 1.

Opposed coupling members 1 of adjacent hose ends each having a gasket 4 are placed gasket 4 to gasket 4. One or other or both of the opposed coupling members 1 are then turned by hand relative to one another so that slots 10 of lugs 6 of respective coupling members 1 engage the ramps 10 of opposing cams 5 of the opposite coupling member 1. The relative rotation of one coupling member 1 towards the facing coupling member 1 is translated into radial travel of one coupling member 1 towards the other coupling member 1 by the angle of the ramp 5. The radial travel causes compression of the gaskets 4 of facing coupling members 1 sufficient to maintain adjoining pieces of hose in place.

This invention relates to a cam and lug fastening mechanism for smaller diameter hose. Cam and lug fastening means were not in common use for smaller ½ inch to ⅞ inch hoses because the fastening means used on larger diameter hose are not generally suitable for assembling small diameter hose. By increasing the ramp angle of the lug and by increasing the thickness and surface area of the gasket on the face of adjoining coupling members the applicant invented a lug and cam fastening means suitable for use with smaller diameter hose.

What is claimed is:

1. A hose coupling member for connection to an identical hose coupling member for use with a ½ to ⅞ inch hose, said coupling member having opposing identical fastening means and a cylindrical opening therethrough, each fastening means comprising a cam, a ramp and lug, each cam having a ramp angle between 4 and 5 degrees, a face surrounding said cylindrical opening inward of each said fastening means and supporting a sealing gasket, the gasket having a thickness of between 220 and 280 microns, and the gasket having a face area between 0.4 and 0.6 square inches.

2. The hose coupling member of claim 1 for a ⅞ inch hose in which the cam has a ramp angle of 4 degrees, a gasket thickness of 250 microns and a gasket face area of 0.5 square inches.

* * * * *

UNITED STATES PATENT AND TRADEMARK OFFICE
CERTIFICATE OF CORRECTION

PATENT NO. : 6,328,350 B1
DATED : December 11, 2001
INVENTOR(S) : Duane Leonhardt It is certified that error appears in the above-identified patent and that said Letters Patent is hereby corrected as shown below:

<u>Title page,</u>
Item [30], Foreign Application Priority Data, as follows:
-- [30]     Foreign Application Priority Data
Feb. 5, 1996    (CA)    Canada    ........................2,168,802 --.

Signed and Sealed this

Thirteenth Day of August, 2002

*Attest:*

*Attesting Officer*

JAMES E. ROGAN
*Director of the United States Patent and Trademark Office*